(12) United States Patent
Gurreri

(10) Patent No.: US 10,782,484 B2
(45) Date of Patent: Sep. 22, 2020

(54) FERRULE-LESS FIBER OPTIC CONNECTOR

(71) Applicant: COMMSCOPE TECHNOLOGIES LLC, Hickory, NC (US)

(72) Inventor: Michael Lawrence Gurreri, York, PA (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/312,038

(22) PCT Filed: Jun. 20, 2017

(86) PCT No.: PCT/US2017/038306
§ 371 (c)(1),
(2) Date: Dec. 20, 2018

(87) PCT Pub. No.: WO2017/223072
PCT Pub. Date: Dec. 28, 2017

(65) Prior Publication Data
US 2019/0162910 A1 May 30, 2019

Related U.S. Application Data

(60) Provisional application No. 62/352,281, filed on Jun. 20, 2016.

(51) Int. Cl.
*G02B 6/38* (2006.01)
*G02B 6/00* (2006.01)

(52) U.S. Cl.
CPC .............. *G02B 6/3821* (2013.01); *G02B 6/38* (2013.01); *G02B 6/3846* (2013.01);
(Continued)

(58) Field of Classification Search
CPC .................................. G02B 6/38; G02B 6/00
(Continued)

(56) References Cited

U.S. PATENT DOCUMENTS 4,588,256 A * 5/1986 Onstott ................ G02B 6/3887
385/87
4,720,161 A * 1/1988 Malavieille .......... G02B 6/2804
385/43
(Continued)

FOREIGN PATENT DOCUMENTS

EP       1 460 464 A1   9/2004
WO    2012/112344 A1   8/2012
(Continued)

OTHER PUBLICATIONS

International Search Report and Written Opinion of the International Searching Authority for International Patent Application No. PCT/US2017/038306 dated Sep. 19, 2017, 11 pages.
(Continued)

*Primary Examiner* — Kaveh C Kianni
(74) *Attorney, Agent, or Firm* — Merchant & Gould P.C.

(57) ABSTRACT

The present disclosure relates to a fiber optic cable and connector assembly including a fiber optic cable and a ferrule-less fiber optic connector. The ferrule-less fiber optic connector includes a main connector body including a distal end and a proximal end. The fiber optic connector also includes a fiber fixation component that mounts within the main connector body and that axially fixes a portion of an optical fiber of the fiber optic cable within the main connector body. The optical fiber includes a bare fiber portion that extends distally beyond the fiber fixation component and includes a free-end portion located at the distal end of the main connector body. The free-end portion is not supported by a ferrule. The optical fiber is anchored relative to the fiber fixation component before the fiber fixation component is mounted within the main connector body.

14 Claims, 11 Drawing Sheets

(52) U.S. Cl.
CPC ......... *G02B 6/3869* (2013.01); *G02B 6/3887* (2013.01); *G02B 6/3893* (2013.01)

(58) Field of Classification Search
USPC .......................................................... 385/78
See application file for complete search history.

(56) References Cited

U.S. PATENT DOCUMENTS

| | | | | |
|---|---|---|---|---|
| 4,818,059 A * | 4/1989 | Kakii | ................... | G02B 6/3839 385/65 |
| 5,073,042 A * | 12/1991 | Mulholland | ......... | G02B 6/3825 385/56 |
| 5,096,276 A * | 3/1992 | Gerace | ................. | G02B 6/3831 385/76 |
| 5,136,672 A * | 8/1992 | Mulholland | ......... | G02B 6/3849 385/53 |
| 5,181,267 A * | 1/1993 | Gerace | ................. | G02B 6/3847 385/80 |
| 6,085,004 A * | 7/2000 | Dower | ................. | G02B 6/3861 385/80 |
| 6,345,916 B1 * | 2/2002 | Yui | ...................... | G02B 6/3652 385/147 |
| 6,974,266 B2 * | 12/2005 | Seguin | ................ | G02B 6/4248 385/68 |
| 7,555,184 B2 * | 6/2009 | Kurosawa | ........... | G02B 6/3861 385/123 |
| 8,870,466 B2 | 10/2014 | Lu | | |
| 9,138,166 B2 * | 9/2015 | Wong | ................... | A61B 5/065 |
| 2002/0186932 A1 * | 12/2002 | Barnes | ................ | G02B 6/3846 385/78 |
| 2002/0186934 A1 * | 12/2002 | Hug | .................... | G02B 6/3825 385/80 |
| 2002/0195611 A1 * | 12/2002 | Yamabayashi | ......... | G02B 6/421 257/98 |
| 2003/0138223 A1 * | 7/2003 | Sasaki | ................. | G02B 6/4214 385/93 |
| 2004/0057691 A1 | 3/2004 | Doss et al. | | |
| 2004/0071407 A1 * | 4/2004 | Vergeest | ............... | G02B 6/3809 385/58 |
| 2010/0329627 A1 * | 12/2010 | Donaldson | ........... | G02B 6/3887 385/137 |
| 2012/0257858 A1 * | 10/2012 | Nhep | ................... | G02B 6/3889 385/78 |
| 2012/0257859 A1 * | 10/2012 | Nhep | ..................... | G02B 6/381 385/81 |
| 2013/0315541 A1 * | 11/2013 | Nhep | ................... | G02B 6/3861 385/80 |
| 2014/0064665 A1 * | 3/2014 | Ott | ........................ | G02B 6/3871 385/60 |
| 2014/0341511 A1 * | 11/2014 | Daems | ................. | G02B 6/3809 385/77 |
| 2015/0253519 A1 * | 9/2015 | Ott | ........................... | G02B 6/36 385/134 |
| 2015/0378109 A1 * | 12/2015 | Samal | .................. | G02B 6/3809 385/58 |
| 2016/0018604 A1 * | 1/2016 | Gurreri | ................ | G02B 6/3825 385/58 |
| 2016/0018605 A1 * | 1/2016 | Ott | ........................ | G02B 6/3887 385/78 |
| 2016/0170152 A1 | 6/2016 | Verheyden et al. | | |
| 2017/0212313 A1 * | 7/2017 | Elenabaas | ............ | G02B 6/3887 |
| 2017/0293088 A1 * | 10/2017 | Manes | ................. | G02B 6/3825 |
| 2017/0343741 A1 * | 11/2017 | Coenegracht | ......... | G02B 6/3894 |
| 2019/0265414 A1 * | 8/2019 | Nhep | ....................... | G02B 6/38 |

FOREIGN PATENT DOCUMENTS

| | | |
|---|---|---|
| WO | 2013/117589 A2 | 8/2013 |
| WO | 2013/117598 A2 | 8/2013 |

OTHER PUBLICATIONS

Extended European Search Report for European Patent Application No. 17816053.7 dated Dec. 19, 2019, 9 pages.

* cited by examiner

FERRULE-LESS FIBER OPTIC CONNECTOR

CROSS-REFERENCE TO RELATED APPLICATION

This application is a National Stage of PCT/US2017/038306, filed on Jun. 20, 2017, which claims the benefit of U.S. Patent Application Ser. No. 62/352,281, filed on Jun. 20, 2016, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to ferrule-less fiber optic connectors.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Such fiber optic adapters can include specialized fiber alignment structures adapted to receive bare optical fibers. Example ferrule-less fiber optic connectors are disclosed by PCT Publication No. WO 2012/112344, PCT Publication No. WO 2013/117598, and U.S. Pat. No. 8,870,466.

SUMMARY

Aspects of the present disclosure relate to a ferrule-less fiber optic connector having an optical fiber fixation arrangement that can be readily and efficiently implemented in a factory setting. Of course, aspects of the present disclosure are also applicable to field terminated connectors.

Another aspect of the present disclosure relates to a ferrule-less fiber optic connector having a fiber fixation arrangement including a fiber fixation component that is pre-secured to an optical fiber of a fiber optic cable before being loaded into a main connector body of the fiber optic connector. In certain examples, the optical fiber is adhesively fixed within the fiber fixation component. In certain examples, the fiber fixation component is mounted adjacent a proximal end of the main connector body after the optical fiber has been anchored or otherwise secured within the fiber fixation component. In certain examples, the optical fiber includes a bare fiber portion that extends distally beyond the fiber fixation component for a length that corresponds to at least 30%, at least 40%, or at least 50% of a length of the main connector body. In certain examples, the bare fiber portion extends from the fiber fixation component through a fiber buckling region defined at least partially within the main connector body to a fiber positioning piece mounted adjacent a distal end of the main connector body. In certain examples, the optical fiber extends through a fiber positioning passage defined by the fiber positioning piece and includes a free end portion that extends distally beyond the fiber positioning piece, the free end portion not being supported by a ferrule. In certain examples, the fiber fixation component engages a proximally facing stop defined by the main connector body so that the fiber fixation component is precisely positioned at a predetermined axial location within the main connector body. In certain examples, the fiber fixation component includes a key or keyway that interfaces with a corresponding key or keyway defined by the main connector body. In certain examples, the fiber fixation component is secured within a proximal (i.e., rear) connector body that mounts at a proximal end of the main connector body. In certain examples, the fiber fixation component is press-fit within a distal end of the rear connector body. In certain examples, the fiber fixation component includes a proximally facing stop that engages a distal end of the rear connector body. In certain examples, the rear connector body is press-fit within the proximal end of the main connector body. In certain examples, at least a portion of the fiber fixation component is captured between a proximally facing stop defined by the main connector body and a portion of the rear connector body. In certain examples, the rear connector body includes teeth or other structures that imbed or otherwise engage an interior of the main connector body. In certain examples, the fiber fixation component includes press-fit ribs that engage an interior of the rear connector body by a press-fit relationship. In certain examples, the rear connector body includes a proximal extension that extends proximally beyond the main connector body and provides a location at which a reinforcing component of fiber optic cable can be anchored (e.g., via a crimp) and also provides a location on which a flexible boot of the fiber optic connector can be mounted. In certain examples, the rear connector body includes an intermediate flange that fits within a proximal pocket defined by the proximal end of the main connector body.

Another aspect of the present disclosure relates to a method for assembling a ferrule-less fiber optic connector including a connector body having a distal end, a proximal end, and a length that extends from the distal end to the proximal end. The method includes securing an optical fiber to a fiber fixation component while the fixation component is located outside of the connector body. The fiber fixation component can include a distal end and a proximal end. The optical fiber can be pre-secured to the fiber fixation component with a bare portion of the optical fiber extending distally beyond the distal end of the fiber fixation component. In certain examples, the bare portion of the optical fiber that extends distally beyond the distal end of the fiber fixation component can have a length that is at least 30%, 40% or 50% of the length of the connector body. The optical fiber is preferably secured to the fiber fixation component by adhesive but in other examples may be secured by alternative techniques such as a heat-shrink sleeve, a mechanical crimp or other techniques. After the optical fiber has been secured to the fiber fixation component, the fiber fixation component is loaded into the proximal end of the main connector body and is preferably axially fixed within the main connector body. With the fiber fixation component mounted adjacent the proximal end of the main connector body, the portion of the optical fiber that extends distally beyond the distal end of the fiber fixation component extends through the main connector body to a location adjacent the distal end of the main connector body. The portion of the optical fiber adjacent the distal end of the main connector body can include a free end portion that is not supported by a ferrule. In certain examples, the free end portion can extend beyond a fiber positioning piece mounted within the main connector body. In certain examples, the fiber positioning piece can position the optical fiber at a desired location at the distal end of the main connector body. In one example, the fiber positioning piece can center the optical fiber within the main connector body. In certain examples, a fiber buckling region can be defined at least partially between the fiber positioning piece and the fiber fixation component. In one example, the optical fiber can slide proximally relative to the fiber positioning element when an optical connection is made with another fiber optic connector. Such proximal movement of the optical fiber causes the optical fiber to buckle within the buckling region. The buckling occurs to take-up the excess fiber within the connector body caused by the proximal movement of the free end portion of the optical fiber. The buckling region is significant since the optical fiber is anchored at the fiber fixation component and is not free to slide back into the cable to accommodate the proximal movement of the free end portion of the optical fiber.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
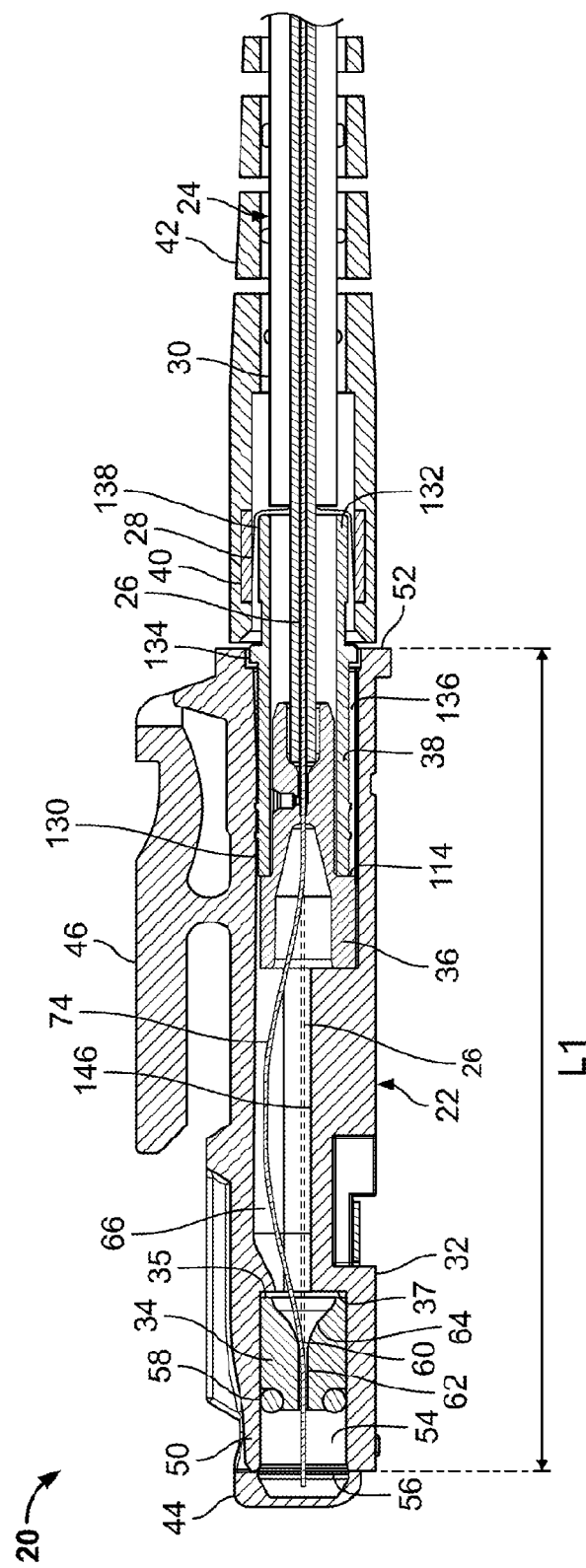
FIG. 1 is a longitudinal cross-sectional view of a ferrule-less fiber optic connector and fiber optic cable assembly in accordance with the principles of the present disclosure.

FIG. 1 illustrates a ferrule-less fiber optic connector and fiber optic cable assembly 20 in accordance with the principles of the present disclosure. The ferrule-less fiber optic connector and fiber optic cable assembly 20 includes a ferrule-less fiber optic connector 22 coupled to the end of a fiber optic cable 24. The fiber optic cable 24 includes an optical fiber 26 and a reinforcing component 28 contained within a cable jacket 30. The fiber optic connector 22 includes a main connector body 32, a fiber positioning piece 34, a fiber fixation component 36, a proximal connector body 38, a crimp 40, a boot 42 and a shutter 44. In certain examples, the main connector body 32 can include a latch 46 for securing the ferrule-less fiber optic connector 22 within a corresponding fiber optic adapter used to optically couple two of the ferrule-less fiber optic connectors 22 together. An example fiber optic adapter is disclosed in PCT Publication No. WO 2013/117598, which is hereby incorporated by reference in its entirety.

Aspects of the present disclosure relate to features that allow the ferrule-less fiber optic connector and fiber optic cable assembly 20 to be efficiently and reliably assembled in a cost effective manner. In certain examples, aspects of the present disclosure allow the ferrule-less fiber optic connector and fiber optic cable assembly 20 to be effectively assembled in a factory setting. In certain examples, the fiber fixation component 36 is configured such that the optical fiber 26 of the fiber optic cable 24 can be effectively anchored or otherwise secured to the fiber fixation component 36 before the fiber fixation component 36 is installed within the main connector body 32. Similarly, in certain examples, an end of the optical fiber 26 can be processed (e.g., cleaved, polished, plasma arc treated, etc.) prior to the fiber optic cable 24 being coupled to the main connector body 32.

It will be appreciated that the terms "distal" and "proximal" are used throughout the present disclosure. In this regard, the term "distal" can be used interchangeably with the term "front" and the term "proximal" can be used interchangeably with the term "rear."

Referring to FIG. 1, the main connector body 32 includes a distal end 50, a proximal end 52 and a length L1 that extends from the distal end 50 to the proximal end 52. The length L1 can be described as an axial length of the main connector body 32. In certain examples, the main connector body 32 can include a molded plastic construction.

Referring still to FIG. 1, the main connector body 32 defines a distal pocket 54 located adjacent the distal end 50 of the main connector body 32. Distal pocket 54 can include an open side 56 that faces in a distal direction. The shutter 44 mounts at the distal end 50 of the main connector body 32. The shutter 44 is preferably movable relative to the main connector body 32 between a first position where the shutter 44 covers the open side 56 of the distal pocket 54 and a second position where the shutter 44 does not cover the open side 56 of the distal pocket 54. In certain examples, the shutter 44 is pivotally connected to the main connector body 32 such that the shutter 44 can pivot relative to the main connector body 32 between the first and second positions. The shutter 44 is designed to protect the end of the optical fiber 26 when the fiber optic connector 22 is not being used to make an optical connection. When it is desired to make an optical connection using the fiber optic connector 22, the fiber optic connector 22 can be inserted into a port of a fiber optic adapter. As the fiber optic connector 22 is inserted into the adapter port, the shutter 44 moves from the first position to the second position to expose and provide access to the end of the optical fiber 26. With the end of the optical fiber exposed, the optical fiber can slide into a fiber alignment structure of the fiber optic adapter which co-axially aligns the optical fiber with an optical fiber of a corresponding fiber optic connector mated with the fiber optic adapter. In this way, an optical connection can be made between the two fiber optic connectors mated with the fiber optic adapter.

The fiber positioning piece 34 of the fiber optic connector 22 mounts within the distal pocket 54 of the main connector body 32. The fiber positioning piece 34 can include an O-ring 58 or other type of elastomeric member that is press-fit against the interior surface of the main connector body 32 defining the distal pocket 54. In certain examples, the fiber positioning piece 34 defines a fiber positioning passage 60 including fiber positioning segment 62 and a fiber lead-in segment 64. The fiber positioning segment 62 of the fiber positioning passage 60 can be slightly larger than a diameter of a bare fiber portion of the optical fiber 26 of the fiber optic cable 24. The fiber positioning segment 62 of the fiber positioning passage 60 can be configured to position the optical fiber 26 at a desired location within the distal pocket 54 so that the optical fiber aligns with the fiber alignment structure of the fiber optic adapter when the fiber optic connector is mated with the fiber optic adapter. In one example, the fiber positioning segment 62 can be configured to position the optical fiber 26 at a central location within the distal pocket 54 (e.g., aligned with a central longitudinal axis of the main connector body 32). The lead-in segment 64 of the fiber positioning passage 60 provides a tapered transition from an enlarged diameter at a proximal end of the fiber positioning piece 34 to a smaller diameter at the fiber positioning segment 62 of the fiber positioning passage 60. In certain examples, the lead-in segment 64 can have a curved transition. In certain examples, the lead-in segment 64 tapers inwardly as the lead-in segment 64 extends in a distal direction. The lead-in segment 64 provides a tapered transition in cross-dimension (e.g., diameter) between the fiber positioning segment 62 (which is relatively small) to a fiber buckling region 66 defined within the main connector body 32. It will be appreciated that the fiber buckling region 66 has a transverse cross-sectional area that is substantially larger than the transverse cross-sectional area of the fiber positioning segment 62 of the fiber positioning passage 60. The fiber positioning piece 34 can include a proximal end 35 that abuts against or opposes a distally facing shoulder 37 or stop provided at the distal pocket 54.

It will be appreciated that the optical fiber 26 is free to slide axially relative to the fiber positioning piece 34 while the fiber positioning piece holds/maintains the radial position of the end portion of the optical fiber relative to the main connector body 32. When the fiber optic connector 22 is mated with its corresponding fiber optic adapter, the end portion of the optical fiber 26 slides into the fiber alignment structure and the end face of the optical fiber abuts against the end face of the optical fiber of the fiber optic connector with which an optical coupling is being made. As the end faces of the optical fibers engage one another, the optical fiber is pushed proximally relative to the main connector body 32 causing the optical fiber 26 to slide proximally relative to the fiber positioning piece 34. This causes excess optical fiber to be present in the main connector body 32.

The excess fiber is taken up through buckling of the optical fiber 26 within the buckling region 66. The optical fiber 26 is anchored by the fiber fixation component 36 at the proximal end of the main connector body 32. Thus, at the fiber fixation component 36, the fiber 26 is prevented from moving axially relative to the main connector body 32 and is prevented from sliding back into the cable jacket. Thus, all of the excess fiber must be taken up distally with respect to the fiber fixation component 36. As the optical fiber buckles within the buckling region 66, the elastic nature of the optical fiber 26 causes the end face of the optical fiber 26 to be spring biased into contact with the end face of the optical fiber corresponding to the fiber optic connector to which an optical connection is being made. Normally, when a connection is not being made, the optical fiber 26 is generally straight within the main connector body 32 (see dashed lines at FIG. 1). When an optical connection is being made, the optical fiber 26 buckles as shown in solid line at FIG. 1.

As indicated above, the fiber optic cable 24 can include the optical fiber 26, the reinforcing component 28 and the cable jacket 30. The optical fiber 26 can include a glass portion 68 covered by a coating layer 70 which is covered by a buffer layer 72. See FIG. 2. The glass portion 68 typically includes a glass core surrounded by a glass cladding layer. It will be appreciated that the cladding layer typically has an outer diameter of about 125 microns or in the range of 120 to 130 microns. The coating layer 70 typically has an outer diameter of around 250 microns or in the range of 200 to 300 microns. The buffer layer 72 typically has an outer diameter of about 900 microns or in the range of 700 to 1100 microns. In certain examples, the coating layer 70 can include a polymeric construction including a material such as acrylate or other polymer. The buffer layer 72 can also include a polymeric composition such as polyvinyl chloride (PVC) or other polymer. In other examples, cables having plastic optical fiber can be used.

Figure 2:
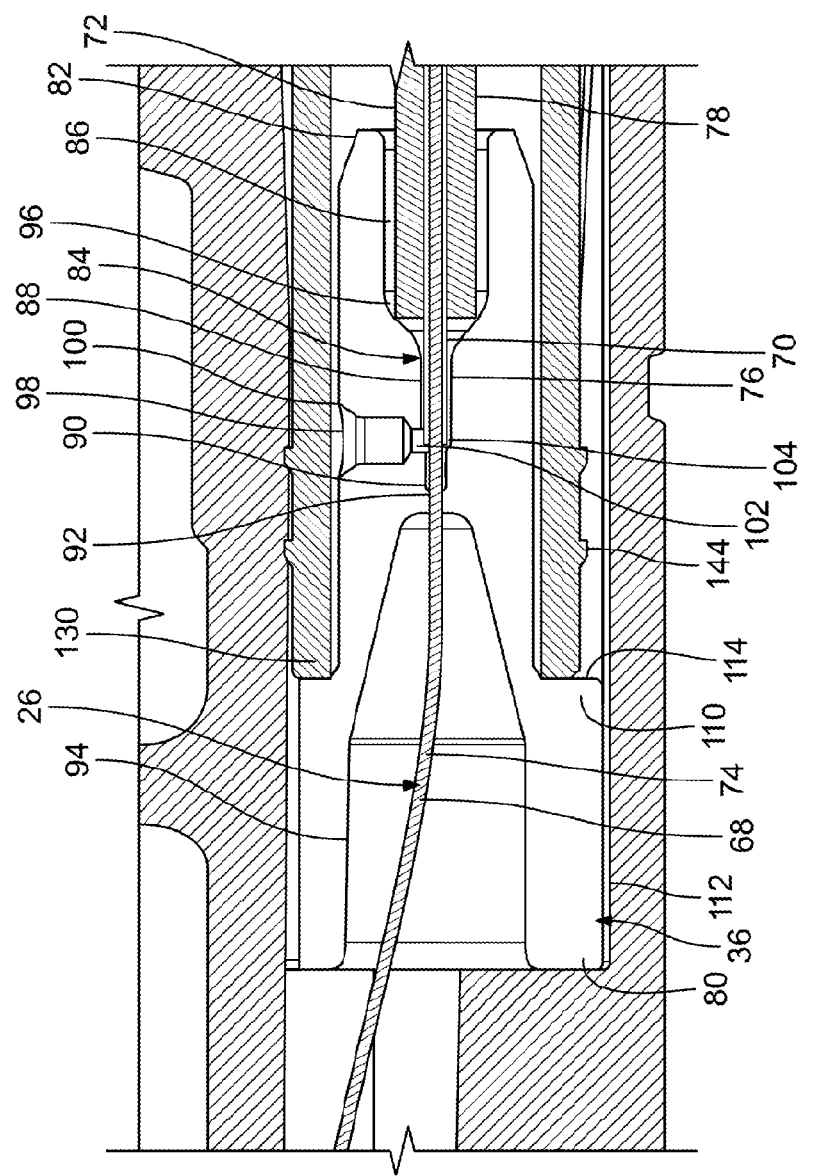
FIG. 2 is an enlarged portion of the ferrule-less fiber optic connector and fiber optic cable assembly of FIG. 1 showing a fiber fixation component secured within a main connector body of the ferrule-less fiber optic connector.

It will be appreciated that the optical fiber 26 can be processed by a processing operation such as a stripping operation. In part of the stripping operation, the coating layer 70 and the buffer layer 72 can be removed from an end section of the optical fiber to form a bare fiber portion 74 at a distal end of the optical fiber 26. Additionally, the optical fiber 26 can also include a portion where the buffer layer 72 is removed while the coating layer 70 is left intact. This section can be referred to as a coated fiber section 76. The remainder of the optical fiber 26 can be left intact with both the buffer layer 72 and the coating layer 70 being used to protect the glass portion 68. This section of the optical fiber 26 can be referred to as a buffered section 78 of the optical fiber 26. As shown at FIG. 2, the coated fiber section 76 is positioned between the bare fiber section 74 and the buffered fiber section 78.

The fiber fixation component 36 can also be described as a plug, insert, body or other structure. As shown at FIG. 2, the fiber fixation component 36 includes a distal end 80, a proximal end 82 and a fiber securement passage 84 that extends axially through the fiber fixation component 36 from the distal end 80 to the proximal end 82. In a preferred example, the fiber securement passage 84 is adapted to fully circumferentially surround or encompass an optical fiber that passes therethrough. In other words, unlike a V-groove or other type of open sided channel or passage, the fiber securement passage 84 does not have an open side and is adapted to fully circumferentially surround the optical fiber 26.

Figure 5:
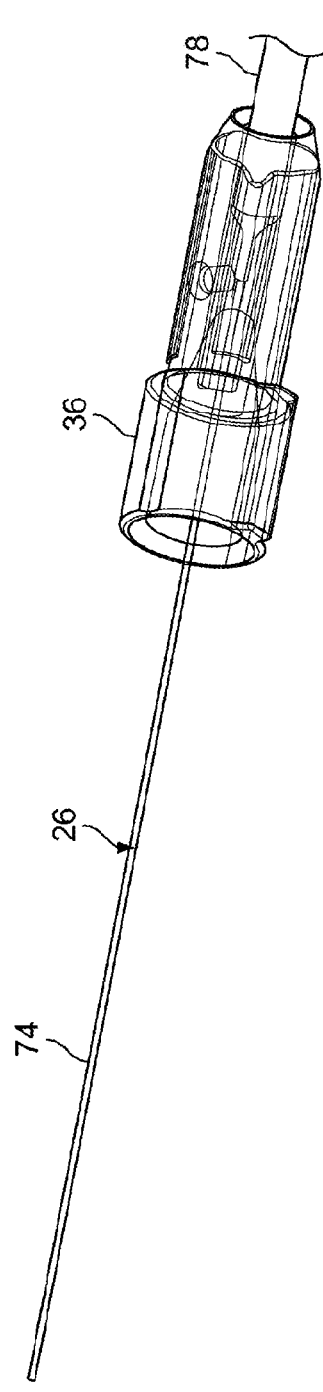
FIG. 5 is a perspective view showing the fiber fixation component of FIGS. 3 and 4 with an optical fiber of the fiber optic cable secured to the fiber fixation component prior to the fiber fixation component being loaded into and secured to the main connector body of the ferrule-less fiber optic connector.

FIG. 5 illustrates the fiber fixation component 36 inserted over the optical fiber 26 with the bare fiber section 74 extending from the distal end 80 of the fiber fixation component 36 and the buffered fiber section 78 extending from the proximal end 82 of the fiber fixation component 36.

Referring back to FIG. 2, the fiber securement passage 84 includes a buffered fiber receiving section 86, a coated fiber securement section 88, a bare fiber securement section 90, a bare fiber exit section 92, and a passage transition section 94. The sections 86-94 are positioned consecutively along the length of the fiber fixation component 36 from the proximal end 82 to the distal end 80. The buffered fiber receiving section 86 has a substantially larger diameter than the coated fiber securement section 88 and a tapered section 96 provides a diameter transition from the buffered fiber receiving section 86 to the coated fiber securement section 88. In one example, the buffered fiber receiving section 86 is adapted for receiving a 900 micron buffered fiber portion and has a diameter of about 1100 microns. In certain examples, the buffered fiber receiving section 86 has a diameter that is 100 to 300 microns larger than the buffered fiber section 78 intended to be positioned therein. The buffered fiber receiving section 86 can also be referred to as a buffered fiber pocket.

The fiber fixation component 36 can also include an adhesive injection port 98 for allowing an adhesive such as epoxy to be injected or otherwise directed into the fiber securement passage 84. The adhesive injection port 98 is positioned at an intermediate location along the length of the fiber fixation component 36 and has an outer end 100 that faces radially outwardly from the fiber fixation component 36. An inner end 102 of the adhesive injection port 98 intersects and is in fluid communication with one or both of the coated fiber securement section 88 and the bare fiber securement section 90 of the fiber securement passage 84. The inner end 102 has a reduced cross-dimension as compared to the outer end 100. The adhesive injection port 98 allows adhesives such as epoxy to be delivered to the coated fiber securement section 88 and the bare fiber securement section 90 for axially fixing (i.e., anchoring or securing) a section of the optical fiber 26 within the fiber fixation component 36.

The coated fiber securement section 88 is adapted to receive the coated fiber section 76 of the optical fiber 26. In one example, the coated fiber section 76 has an outer diameter of about 250 microns and the coated fiber securement section 88 has a diameter of about 300 microns. In certain examples, the coated fiber securement section 88 has a diameter that is 25 to 75 microns larger than the outer diameter of the coated fiber section 76 intended to be received therein.

The bare fiber securement section 90 is adjacent to the coated fiber securement section 88 and has a smaller diameter than the coated fiber securement section 88. A step 104 can be provided between the coated fiber securement section 88 and the bare fiber securement section 90. In one example, the bare fiber securement section 90 is adapted to receive a section of the bare fiber portion 74. In one example, the bare fiber portion 74 can have an outer diameter of about 125 microns and the bare fiber securement section 90 can have a diameter of about 200 microns. In certain examples, the bare fiber securement section 90 can have a diameter that is 50 to 100 microns larger than the bare fiber intended to be received therein. It will be appreciated that the coated fiber securement section 88 is intentionally oversized with respect to the coated fiber section 76 received therein and the bare fiber securement section 90 is intentionally oversized with respect to the bare fiber portion 74 received therein so as to provide sufficient space to receive adhesive that fully surrounds the bare fiber portion 74 and the coated fiber section 76 for securing such sections securely within the fiber fixation component 36.

The bare fiber exit section 92 has a diameter that is smaller than the corresponding diameter of the bare fiber securement section 90. A tapered transition or a discreet diameter step can be provided between the bare fiber securement section 90 and the bare fiber exit section 92. In one example, the bare fiber exit section 92 has a diameter of about 126 microns and the bare fiber portion 74 that passes therethrough has an outer diameter of about 125 microns. Thus, the bare fiber exit section 92 is closely sized with respect to its corresponding bare fiber portion 74 so as to prevent epoxy from exiting the bare fiber securement section 90 during the injection process. In certain examples, the bare fiber exit section 92 is no more than 5 microns larger than the bare fiber portion 74 intended to pass therethrough.

The passage transition section 94 transitions from the relatively small cross-dimension (e.g., diameter) at the bare fiber exit section 92 to a relatively large cross-dimension (e.g., diameter) at the distal end 80 of the fiber fixation component 36. In this way, the passage transition section 94 provides a smooth transition from the location where the optical fiber is anchored to the fiber buckling region 66. It will be appreciated that the distal and proximal ends 80, 82 of the fiber fixation component 36 can be radiused (i.e., filleted) at the entrance and exit ends of the fiber securement passage 84.

Figure 4:
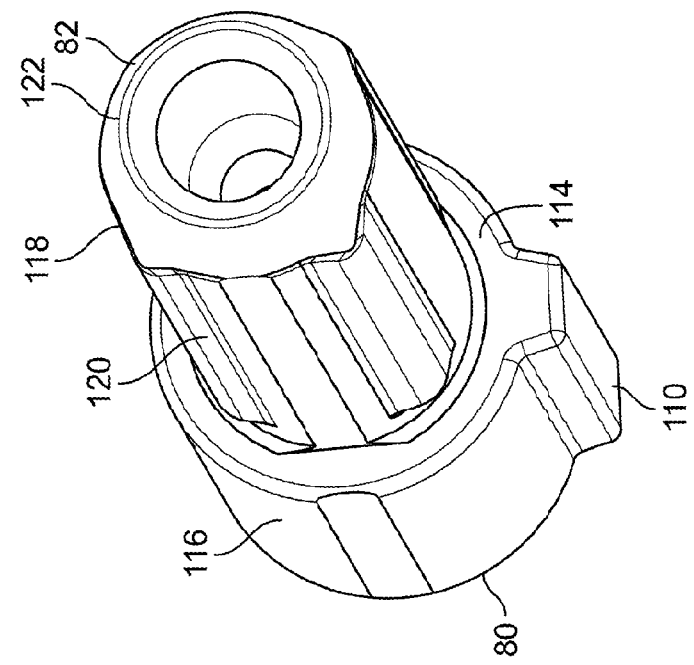
FIG. 4 is a perspective view showing a proximal end of the fiber fixation component of FIG. 3.
Figure 3:
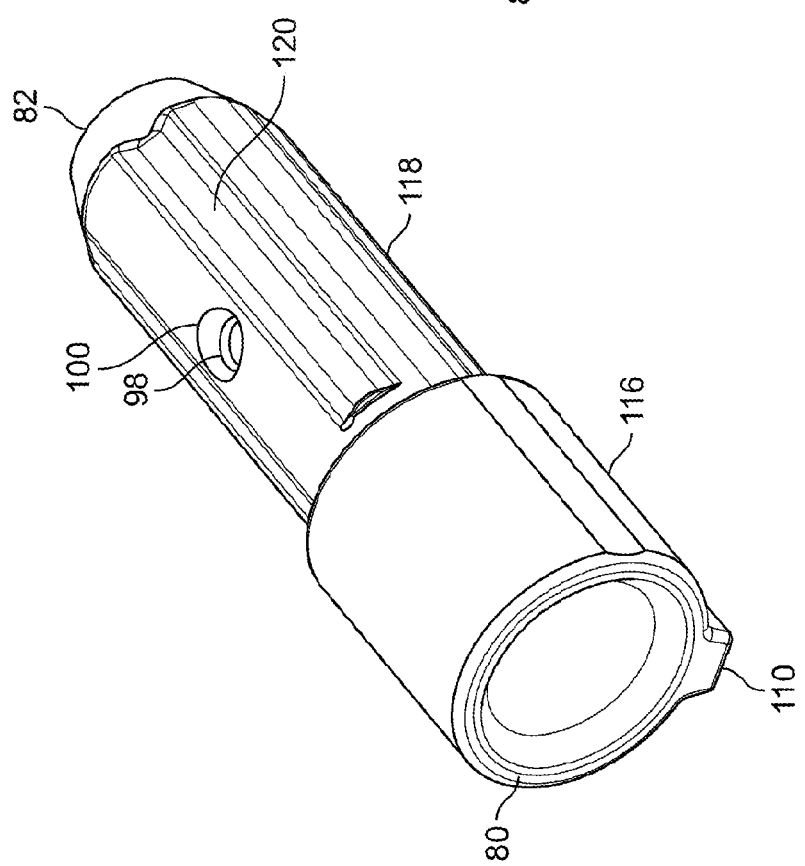
FIG. 3 is a perspective view showing a distal end of the fiber fixation component of the ferrule-less fiber optic connector and fiber optic cable assembly of FIGS. 1 and 2.

The fiber fixation component 36 can also include various exterior structures. For example, referring to FIGS. 2-4, the fiber fixation component 36 can include an exterior key 110 that fits within a corresponding keyway 112 defined by the main connector body 32 to ensure that the fiber fixation component 36 is inserted into the main connector body 32 at a particular rotational orientation relative to the main connector body 32 and to prevent relative rotation between the main connector body 32 and the fiber fixation component 36. Additionally, the fiber fixation component 36 includes a proximally facing shoulder or flange 114 that provides a transition in outer cross-dimension from an enlarged portion 116 at the distal end 80 to a reduced portion 118 adjacent the proximal end 82. The reduced portion 118 includes a plurality of longitudinal press-fit ribs 120 that are circumferentially spaced about the reduced portion 118. The proximal end 82 of the fiber fixation component 36 can include a tapered nose 122.

The reduced portion 118 of the fiber fixation component 36 is adapted to be received within the proximal connector body 38 such that the fiber fixation component 36 is secured relative to the proximal connector body 38. In one example, the press-fit ribs 120 are compressed when the reduced cross-dimension portion 116 is inserted into the proximal connector body 38 such that a press-fit connection is made between the fiber fixation component 36 and the proximal connector body 38. In other examples, securement techniques such as fasteners, adhesive or crimps can be used. The fiber fixation component 36 is inserted into the proximal connector body 38 until a distal end 130 of the proximal connector body 38 abuts against the flange 114 of the fiber fixation component 36. The proximal connector body 38 includes the distal end 130 in which the fiber fixation component 36 is inserted and also includes an opposite proximal end 132. The distal end 130 of the proximal connector body 38 is adapted to be inserted into the proximal end 52 of the main connector body 32. Preferably, the proximal connector body 38 is secured in place relative to the main connector body 32. In one example, the proximal connector body 38 can be secured within the main connector body 32 by a press-fit connection. For example, the proximal connector body 38 can include ribs, teeth or other structures 144 that embed into the main connector body 32 to provide a secure connection therebetween. In other examples, the teeth or other structures can snap within corresponding recesses predefined within the connector body 32.

In certain examples, the proximal connector body 38 has a metal composition. The proximal connector body 38 also includes an intermediate outer flange 134 that fits within a proximal pocket 136 defined by the proximal end 52 of the connector body 32. When the proximal connector body 38 is press-fit within the main connector body 32, a proximal section 138 projects proximally outwardly from the main connector body 32. The proximal section 138 provides an anchoring location at which the reinforcing component 28 (e.g., reinforcing elements such as reinforcing yarn formed by Aramid, fiberglass or other structures) can be secured through the use of the crimp 40. Additionally, the proximal section 138 provides a location where the boot 42 can be secured. For example, the boot 42 can be press-fit over the top of the crimp. Moreover, the proximal section 138 can include a notch or other structure into which an inner shoulder of the boot can snap or otherwise fit.

In certain examples, the fiber fixation component 36 can be made of a plastic material. In certain examples, the fiber fixation component 36 can be made of non-glass filled plastic that is transparent to UV radiation. By using a material that is transparent to UV radiation, UV radiation can be directed through the body of the fiber fixation component 36 so as to cure the epoxy injected therein. In other examples, the epoxy within the fiber fixation component 36 can be cured by heat or other means.

Figure 6:
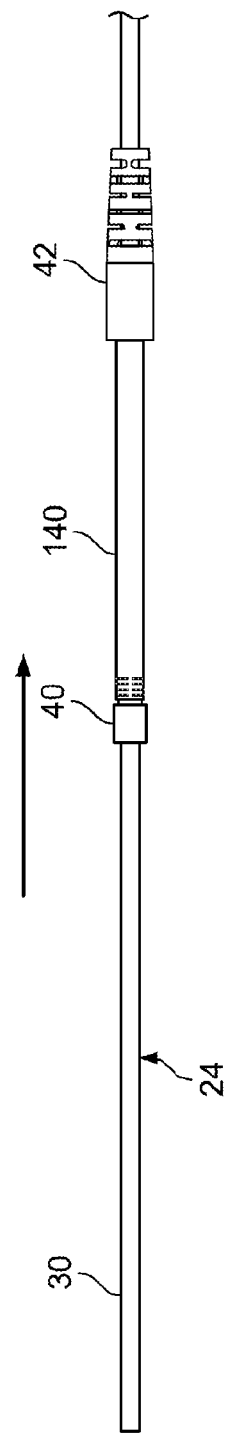
FIG. 6 shows an initial step in an example sequence of steps for assembling the fiber optic connector and fiber optic cable assembly of FIG. 1 in which a boot, a crimp, and a heat shrink tube are slid over a fiber optic cable.
Figure 7:
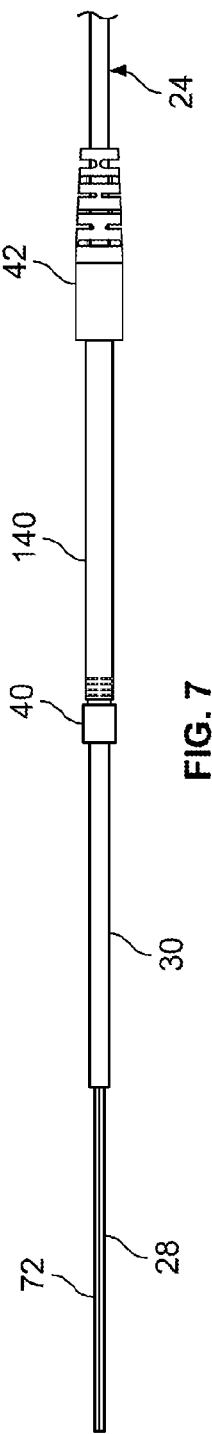
FIG. 7 shows a subsequent step in the example assembly sequence in which an end portion of a cable jacket of the fiber optic cable is removed.
Figure 8:
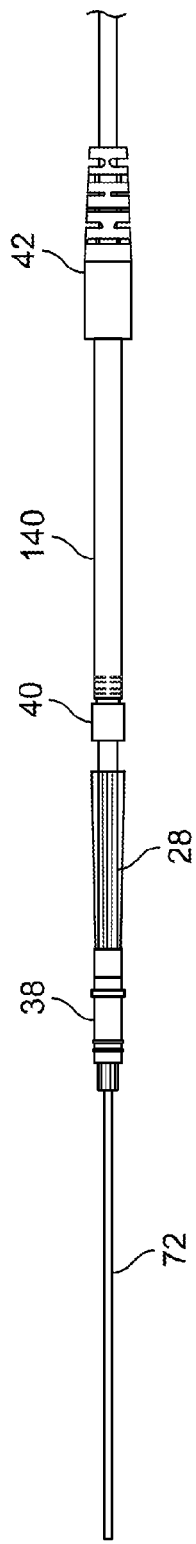
FIG. 8 shows another step in the example assembly sequence in which a reinforcing component of the fiber optic cable is secured.
Figure 9:
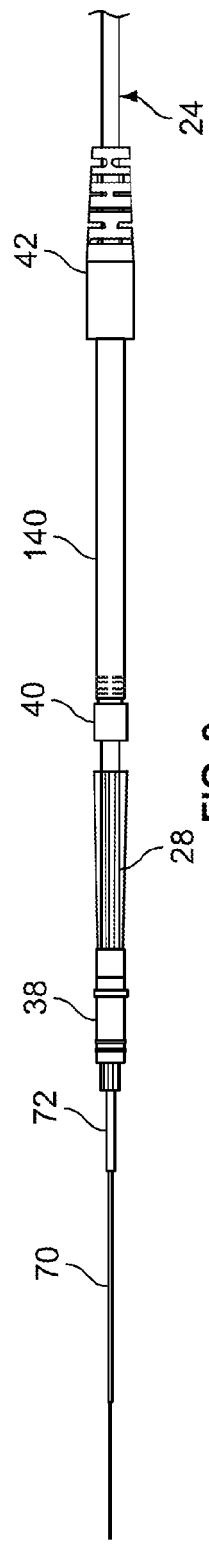
FIG. 9 shows a step in the example assembly sequence in which a portion of a buffer layer of the fiber optic cable is removed.
Figure 10:
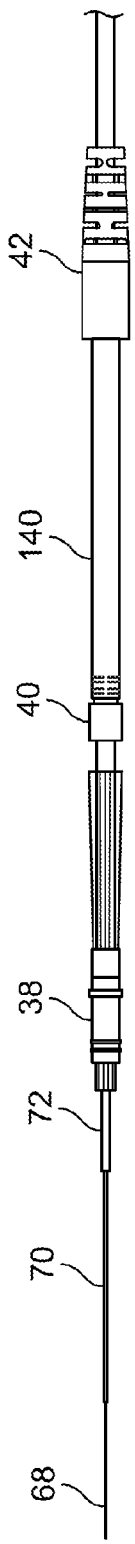
FIG. 10 shows a step in the example assembly sequence in which a portion of a coating layer of the fiber optic cable is removed.
Figure 10A:
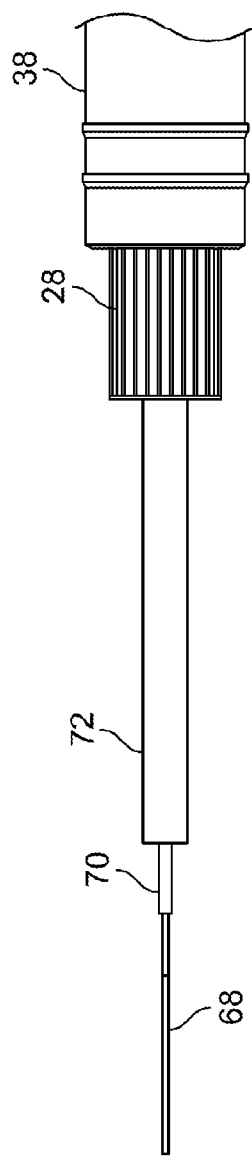
FIG. 10A shows an enlarged portion of FIG. 10.
Figure 11:
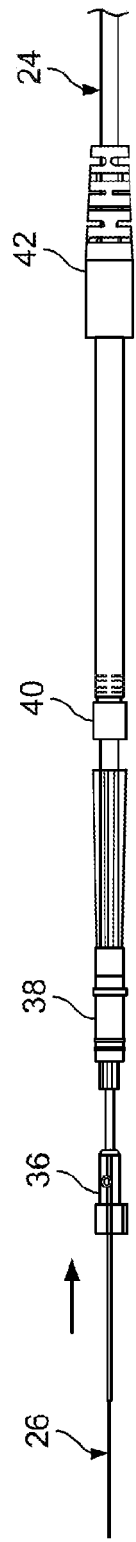
FIG. 11 shows a step in the example assembly sequence in which a fiber fixation component is inserted over the fiber optic cable.
Figure 11A:
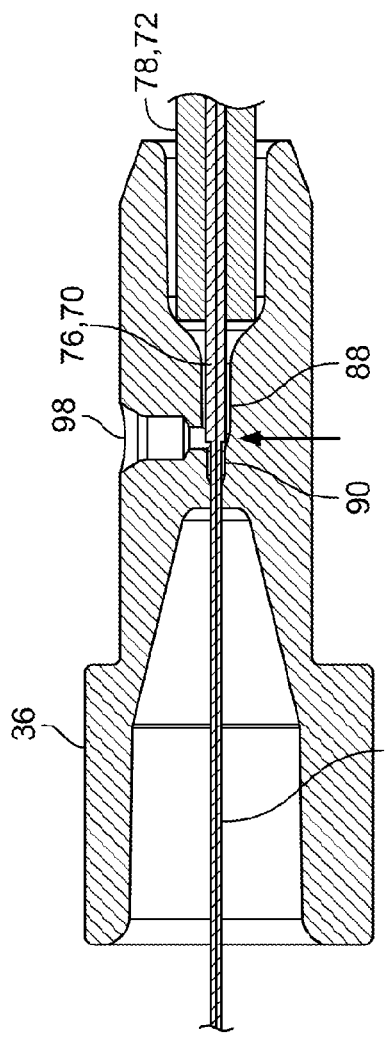
FIG. 11A shows an enlarged longitudinal cross-sectional view of a portion of FIG. 11.
Figure 12:
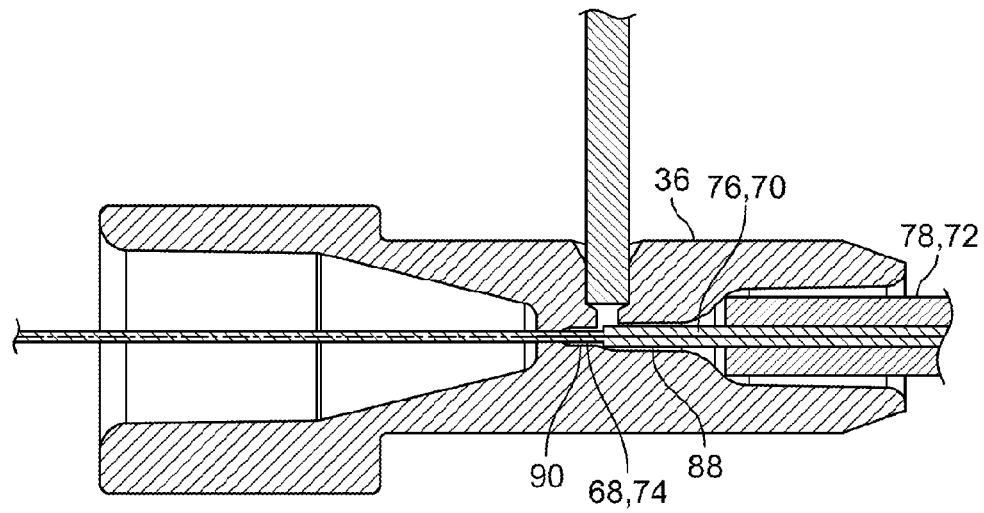
FIG. 12 shows a step in the example assembly sequence in which epoxy is injected into the fiber fixation component through an adhesive injection port in order to adhesively secure the optical fiber within the fiber fixation component.
Figure 13:
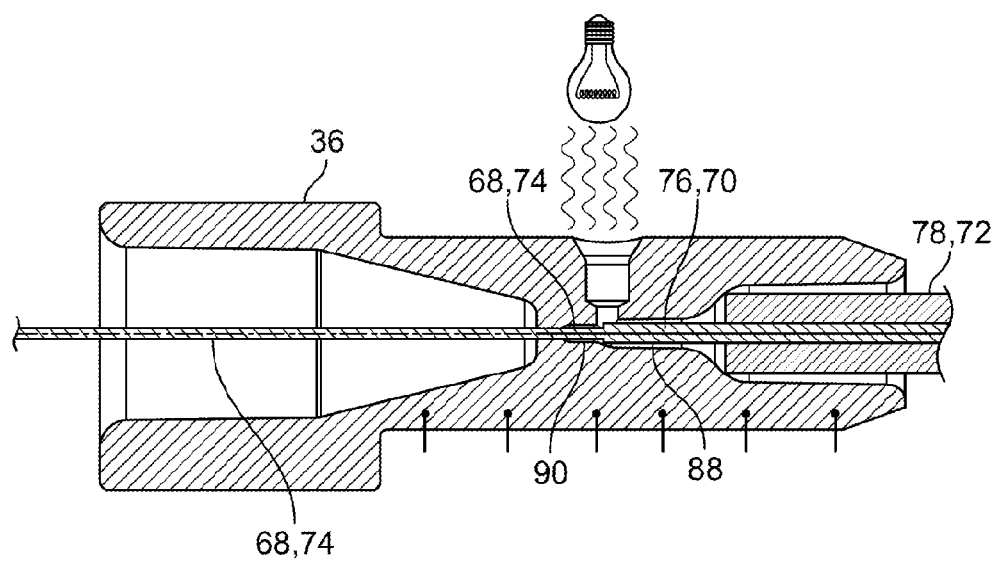
FIG. 13 shows a step in the example assembly sequence in which the epoxy is partially cured by exposure to a radiation source.
Figure 14:
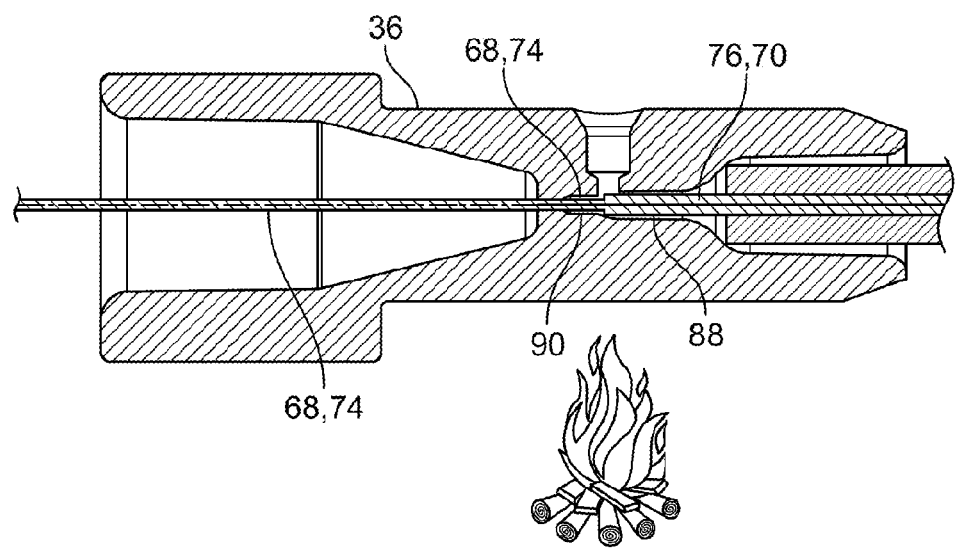
FIG. 14 shows a step in the example assembly sequence in which the epoxy is finally cured.
Figure 15:
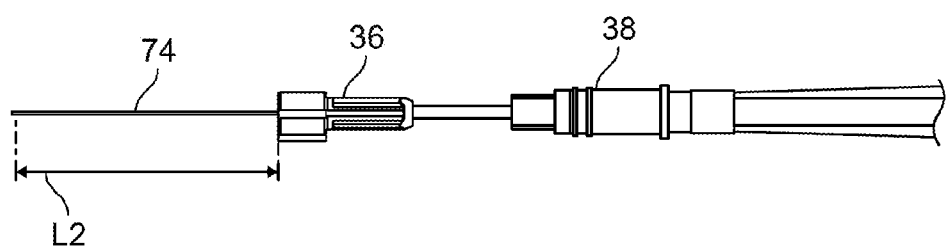
FIG. 15 shows a step in the example assembly sequence in which a bare fiber portion of the optical fiber is cleaved and processed.
Figure 16:
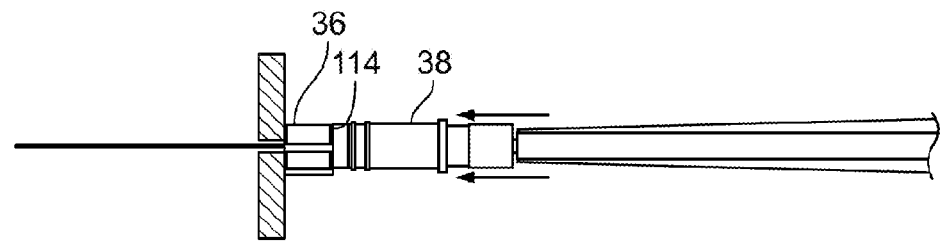
FIG. 16 shows a step in the example assembly sequence in which a proximal connector body is press-fit over the fiber fixation component.

FIGS. 6-22 illustrate an example sequence of processing steps for assembling the ferrule-less fiber optic connector and fiber optic cable assembly 20. As shown at FIG. 6, the boot 42, the crimp 40 and a heat shrink tube 140 are slid over one end of the fiber optic cable 24. Next, as shown at FIG. 7, an end portion of the cable jacket 30 is removed by a stripping process to expose the cable reinforcing component 28 and the buffered optical fiber 72. The reinforcing component 28 is then folded back and captured under the proximal connector body 38 which is inserted over the end of the fiber optic cable 24 (see FIG. 8). Next, an end section of the buffer layer 72 is removed by a stripping operation to expose the coating layer 70 as shown at FIG. 9. Thereafter, an end portion of the coating layer 70 is removed to expose the glass portion 68 of the fiber optic cable 24 (see FIGS. 10 and 10A). Thereafter, as shown at FIGS. 11 and 11A, the fiber fixation component 36 is inserted over the fiber optic cable 24 and is inserted until the coated fiber section 76 of the fiber optic cable 24 bottoms on the step defined between the coated fiber securement section 88 and the bare fiber securement section 90. A fixture can be used to hold the optical fiber 26 in the position of FIGS. 11 and 11A. With the optical fiber 26 held in axial position relative to the fiber fixation component 36, epoxy is injected into the fiber fixation component 36 through the adhesive injection port 98 (see FIG. 12) such that the epoxy flows around the coated fiber section 76 and the bare fiber portion 74 of the optical fiber 26 at the coated fiber securement section 88 and the bare fiber securement section 90. While the optical fiber 26 continues to be held in place relative to the fiber fixation component 36 by a fixture, the epoxy is initially tack cured by exposure to a radiation source such as ultraviolet light (see FIG. 13). The ultraviolet light can pass through the body of the fiber fixation component 36 to reach the epoxy contained internally within the coated fiber securement section 88 and the bare fiber securement section 90 (see FIG. 13). Next, as shown at FIG. 14, the epoxy can be finally cured through the use of heat.

Once the optical fiber 26 has been adhesively secured within the fiber fixation component 36, the bare fiber portion 74 of the optical fiber 26 that extends distally beyond the fiber fixation component 36 can be cleaved to a specific desired length L2. See FIG. 15. It will be appreciated that the dimension L2 is important for the distal most end of the bare fiber portion 74 to be positioned at the correct axial position within the main connector body 32 adjacent the distal end 50 the main connector body 32. A fixture can be used to exactly establish the proper length L2. In certain examples, the length L2 is at least 30%, 40% or 50% as long as the length L1 of the main connector body 32. Once the bare fiber portion 74 has been cleaved to the desired length, the distal end face of the bare fiber portion 74 can be processed by a processing technique such as plasma or arc treatment of the end face. An example arc treatment operation is disclosed by PCT Publication No. WO 2012/112344, which is hereby incorporated by reference in its entirety.

Figure 17:
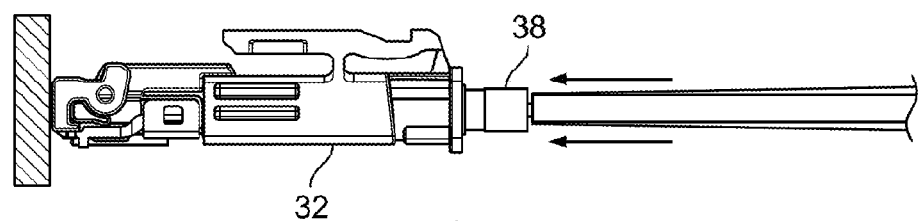
FIG. 17 shows a step in the example assembly sequence in which a sub-assembly of the proximal connector body and the fiber fixation component is inserted into a main connector body.
Figure 18:
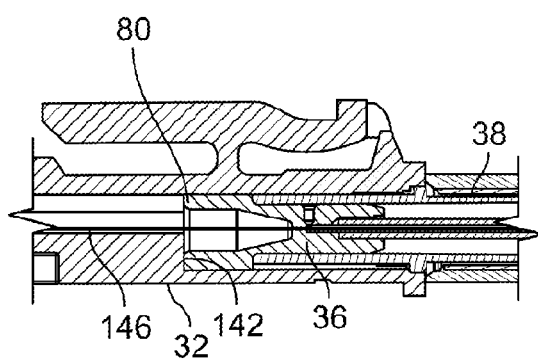
FIG. 18 shows an enlarged longitudinal cross-sectional view of a portion of FIG. 17.

Once the end face of the bare fiber portion 74 has been cleaved and processed, the proximal connector body 38 can be inserted over the reduced portion 118 of the fiber fixation component 36. The insertion process continues until the distal end 130 of the proximal connector body 38 abuts against the proximal facing flange 114 of the fiber fixation component 36 (see FIG. 16). The press-fit ribs 120 are crushed by the proximal connector body 38 during the insertion process and provide a press-fit connection between the fiber fixation component 36 and the proximal connector body 38. Once the proximal connector body 38 has been press-fit over the proximal end of the fiber fixation component 36, the resultant assembly is inserted into the proximal end 52 of the main connector body 32 as shown at FIGS. 17 and 18. The insertion process continues until the distal end 80 of the fiber fixation component 36 abuts against a stop 142 located within the main connector body 32. During the insertion process, retention teeth 144 of the proximal connector body 38 imbed within the main connector body 32 to provide a press-fit connection therein between. As the subassembly formed by the fiber fixation component 36 and the proximal connector body 38 is inserted into the proximal end 52 of the main connector body 32, the bare fiber portion 74 slides along a guide surface 146 within the connector body 32. The guide surface 146 is aligned along a plane that intersects the lead-in section 64 of the fiber positioning passage 60. Thus, the bare fiber portion 74 is guided into the lead-in segment 64 of the fiber positioning piece and is then guided through the fiber positioning passage 60 such that the fiber positioning passage 60 positions the end of the bare fiber portion 74 at a pre-defined location at the distal end 50 of the main connector body 32. It will be appreciated that a distal most section of the bare fiber portion 74 forms a free end portion that extends distally beyond the fiber positioning piece 34. The free end portion of the bare fiber portion 74 is not supported by a ferrule. Thus, the fiber optic connector 22 is a ferrule-less fiber optic connector.

Figure 19:
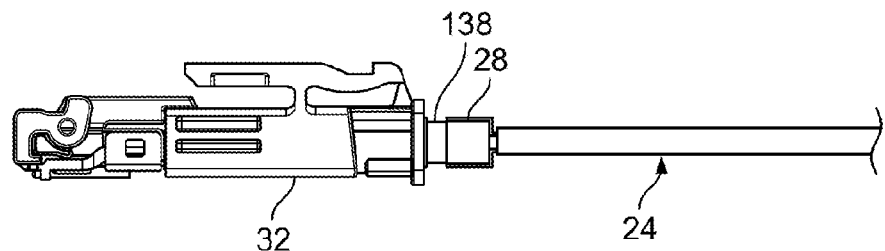
FIG. 19 shows a step in the example assembly sequence in which a reinforcing component of the fiber optic cable is positioned over the proximal connector body.
Figure 20:
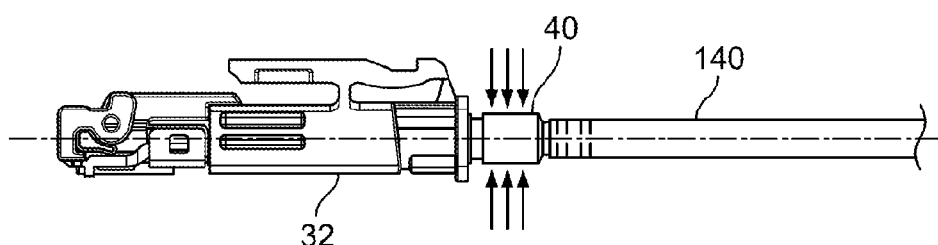
FIG. 20 shows a step in the example assembly sequence in which the crimp and the heat shrink tube are slid over the proximal connector body.
Figure 21:
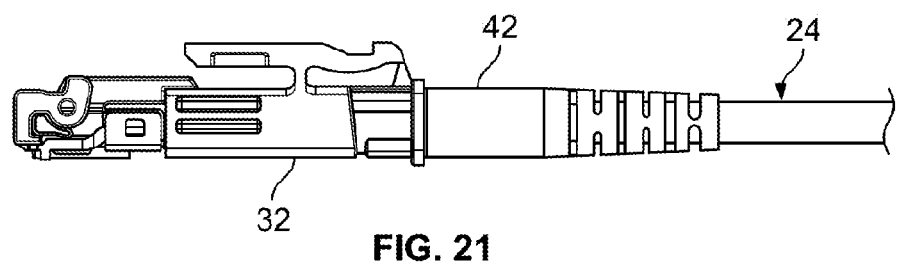
FIG. 21 shows a step in the example assembly sequence in which the boot is slid over the crimp.
Figure 22:
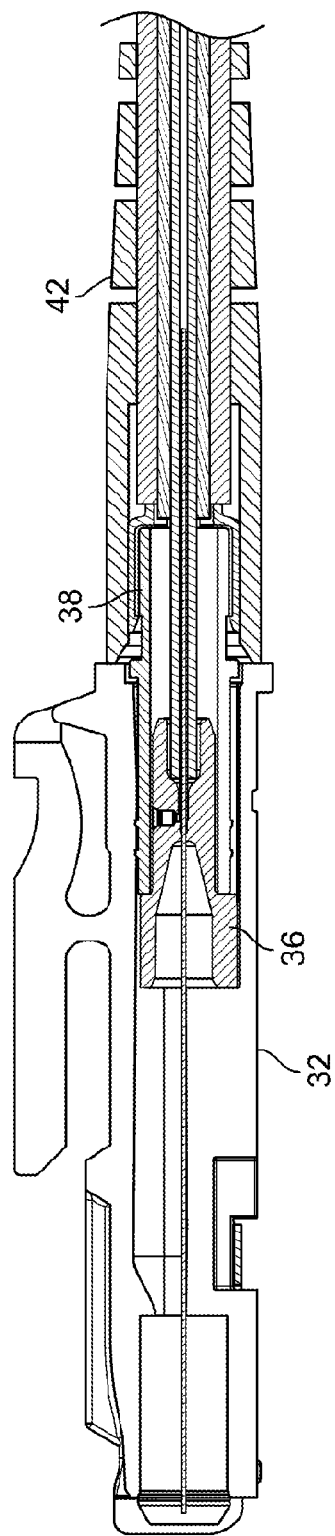
FIG. 22 is another cross-sectional view of the fiber optic connector and fiber optic cable assembly of FIG. 1 with the addition of a heat shrink sleeve at the proximal end of the fiber optic connector.

After the sub-assembly formed by the fiber fixation component 36 and the proximal connector body 38 have been fully loaded and secured within the proximal end 52 of the main connector body 32, the reinforcing component 28 of the fiber optic cable 24 is cut to length and positioned over the proximal section 138 of the proximal connector body 38 (see FIG. 19). Next, the crimp 40 and the heat shrink tube 140 are slid up over the proximal section 138 as shown at FIG. 20. The crimp 40 can be compressed to secure the reinforcing component 28 to the proximal section 138. Additionally, the heat shrink tube 140 can be heated to provide a seal at the proximal end of the fiber optic connector. Finally, the boot 42 can be slid into place over the crimp 40 (see FIG. 21). FIG. 22 is a cross-sectional view showing the fully assembled fiber optic connector and fiber optic cable assembly 20.

What is claimed is:

1. A fiber optic cable and connector assembly comprising:
a fiber optic cable including an optical fiber protected by a cable jacket;
a ferrule-less fiber optic connector including a main connector body including a distal end and a proximal end; and
a fiber fixation component that mounts within the main connector body and that axially fixes a portion of the optical fiber within the main connector body, the optical fiber including a bare fiber portion that extends distally beyond the fiber fixation component and includes a free-end portion located at the distal end of the main connector body, the free-end portion not being supported by a ferrule, wherein the optical fiber is adapted to be anchored relative to the fiber fixation component before the fiber fixation component is mounted within the main connector body;
wherein the optical fiber is adhesively secured within the fiber fixation component;
wherein the fiber fixation component defines a fiber securement passage that fully surrounds the optical fiber circumferentially;
wherein the fiber fixation component defines an adhesive injection port through a side of the fiber fixation component; and
wherein the fiber securement passage includes a bare fiber securement section that receives the bare fiber portion of the optical fiber and a coated fiber securement section that receives a coated fiber portion of the optical fiber, wherein the bare fiber securement section has a smaller cross-dimension than the coated fiber securement section, and wherein the adhesive injection port intersects at least one of the coated fiber securement section or the bare fiber securement section.

2. The fiber optic cable and connector assembly of claim 1, wherein the fiber fixation component has a construction including a material through which UV radiation can pass.

3. The fiber optic cable and connector assembly of claim 1, wherein the adhesive injection port is located at an interface between the bare fiber securement section and the coated fiber securement section.

4. The fiber optic cable and connector assembly of claim 3, wherein the bare fiber securement section is positioned at a distal end of the coated fiber securement section with a step defined therebetween.

5. The fiber optic cable and connector assembly of claim 4, wherein the fiber securement passage includes a fiber exit section positioned at a distal end of the bare fiber securement section, the fiber exit section having a smaller cross-dimension than the bare fiber securement section.

6. The fiber optic cable and connector assembly of claim 5, wherein the fiber securement passage includes a buffer receiving section positioned at a proximal end of the coated fiber securement section, the buffer receiving section having a cross-dimension larger than the coated fiber securement section, and the optical fiber including a buffered section that is received with the buffer receiving section.

7. The fiber optic cable and connector assembly of claim 6, wherein the fiber securement passage includes a tapered transition section positioned distally adjacent to the fiber exit section that has a cross-dimension that expands as the tapered transition section extends in a distal direction.

8. The fiber optic cable and connector assembly of claim 7, wherein a fiber positioning piece is mounted at the distal end of the main connector body, wherein the fiber positioning piece defines a fiber positioning passage through which the bare fiber portion of the optical fiber extends, and wherein a fiber buckling region is defined at least partially between the fiber positioning piece and the fiber fixation component.

9. The fiber optic cable and connector assembly of claim 1, wherein the fiber fixation component fits within a proximal connector body that mounts at the proximal end of the main connector body.

10. The fiber optic cable and connector assembly of claim 9, wherein the fiber fixation component press-fits within the proximal connector body and the proximal connector body press-fits within the main connector body.

11. The fiber optic cable and connector assembly of claim 10, wherein the fiber optic cable includes a reinforcing component that is coupled to the proximal connector body.

12. The fiber optic cable and connector assembly of claim 1, wherein the fiber fixation component includes an exterior key that fits within a corresponding keyway defined by the main connector body to ensure that the fiber fixation component is inserted into the main connector body at a particular rotational orientation relative to the main connector body and to prevent relative rotation between the main connector body and the fiber fixation component.

13. A fiber optic cable and connector assembly comprising:
    a fiber optic cable including an optical fiber protected by a cable jacket;
    a ferrule-less fiber optic connector including a main connector body including a distal end and a proximal end; and
    a fiber fixation component that mounts within the main connector body and that axially fixes a portion of the optical fiber within the main connector body, the optical fiber including a bare fiber portion that extends distally beyond the fiber fixation component and includes a free-end portion located at the distal end of the main connector body, the free-end portion not being supported by a ferrule, wherein the optical fiber is adapted to be anchored relative to the fiber fixation component before the fiber fixation component is mounted within the main connector body;
    wherein the optical fiber is adhesively secured within the fiber fixation component;
    wherein the fiber fixation component defines a fiber securement passage that fully surrounds the optical fiber circumferentially;
    wherein the fiber fixation component defines an adhesive injection port through a side of the fiber fixation component; and
    wherein the fiber fixation component has a construction including a material through which UV radiation can pass.

14. The fiber optic cable and connector assembly of claim 13, wherein the fiber fixation component includes an exterior key that fits within a corresponding keyway defined by the main connector body to ensure that the fiber fixation component is inserted into the main connector body at a particular rotational orientation relative to the main connector body and to prevent relative rotation between the main connector body and the fiber fixation component.

* * * * *